United States Patent
Schobben et al.

(10) Patent No.: US 12,472,347 B2
(45) Date of Patent: Nov. 18, 2025

(54) SYSTEM AND METHOD FOR SELF-PROGRAMMING STIMULATION SETTINGS

(71) Applicant: Salvia BioElectronics B.V., Eindhoven (NL)

(72) Inventors: Daniel Schobben, Eindhoven (NL); Hubert Martens, Eindhoven (NL)

(73) Assignee: Salvia BioElectronics B.V., Eindhoven (NL)

( * ) Notice: Subject to any disclaimer, the term of this patent is extended or adjusted under 35 U.S.C. 154(b) by 260 days.

(21) Appl. No.: 17/363,077

(22) Filed: Jun. 30, 2021

(65) Prior Publication Data
US 2023/0001185 A1     Jan. 5, 2023

(51) Int. Cl.
*A61N 1/05* (2006.01)
*A61N 1/36* (2006.01)

(52) U.S. Cl.
CPC ....... *A61N 1/0526* (2013.01); *A61N 1/36075* (2013.01); *A61N 1/36096* (2013.01); *A61N 1/36132* (2013.01); *A61N 1/36171* (2013.01); *A61N 1/36178* (2013.01)

(58) Field of Classification Search
CPC .............. A61N 1/0526; A61N 1/36075; A61N 1/36096; A61N 1/36132; A61N 1/36171; A61N 1/36178; A61N 1/0531
See application file for complete search history.

(56) References Cited

U.S. PATENT DOCUMENTS

| | | | |
|---|---|---|---|
| 6,393,325 B1 * | 5/2002 | Mann | A61N 1/3787 607/46 |
| 8,942,819 B2 | 1/2015 | Hincapie Ordonez | |
| 9,050,473 B2 | 6/2015 | Woods et al. | |
| 9,248,286 B2 | 2/2016 | Simon et al. | |
| 9,295,840 B1 | 3/2016 | Thacker et al. | |
| 2006/0241720 A1 * | 10/2006 | Woods | A61N 1/36071 600/557 |
| 2014/0067007 A1 * | 3/2014 | Drees | G06F 3/04812 345/158 |
| 2016/0022995 A1 | 1/2016 | Kothandaraman et al. | |
| 2016/0022996 A1 | 1/2016 | Kaula et al. | |
| 2016/0038741 A1 * | 2/2016 | Perryman | A61N 1/37205 607/46 |
| 2017/0050035 A1 * | 2/2017 | Gupta | A61N 1/37211 |
| 2017/0303087 A1 * | 10/2017 | Wirola | G01S 5/02524 |
| 2019/0374776 A1 * | 12/2019 | Mishra | A61N 1/3752 |

FOREIGN PATENT DOCUMENTS

WO   WO-2021033139 A1 *   2/2021   ........... A61N 1/0456

OTHER PUBLICATIONS

Schwedt et al., Neurostimulation for Treatment of Migraine and Cluster Headache, Wiley Periodicals, Inc., Pain Medicine 2015; 16: 1827-1834, The American Academy of Pain Medicine.

* cited by examiner

*Primary Examiner* — Brian T Gedeon
(74) *Attorney, Agent, or Firm* — Fresh IP PLC; Clifford D. Hyra; Aubrey Y. Chen

(57) ABSTRACT

A method includes configuring, by a computing device, stimulation settings for each electrode in an at least one electrode array in physical contact with a patient, the stimulation settings having adjustable parameters comprising frequency, pulse width, and amplitude, obtaining, by the computing device, feedback information from the patient, and automatically adjusting, by the computing device, at least one of the adjustable parameters based on the feedback information from the patient.

32 Claims, 9 Drawing Sheets

FIG. 5

SYSTEM AND METHOD FOR SELF-PROGRAMMING STIMULATION SETTINGS

BACKGROUND

The human body is controlled by patterns of electrical impulses transmitted through nerve fibers. In case of a chronic neurological disease, these electrical patterns may be affected. As an example, people may suffer from chronic migraines, pain, or mental disorders, among others. A migraine may affect electrical impulses in the brain. Bioelectronic devices may use mild electrical impulses to influence nerve activity and potentially address the issues in the electrical patterns. The bioelectronic devices may provide an implanted neurostimulation system for those suffering from migraines.

Unfortunately, it can be difficult to determine how to best provide a therapy for a patient and each patient may be different. In some cases, each patient may go through a trial-and-error approach to determine the best way to receive therapy. The bioelectronic devices may have to be configured for each therapy session and it may take months for a therapeutic effect to be established. Each patient may have to schedule and attend weeks or months of follow-up visits to iteratively adapt and try to arrive at an effective therapy.

The hearing industry has greatly benefited from auditory self-tests. Patients may take tests on their own and respond to stimuli that scan a wide frequency range and vary in amplitude depending on patients' responses.

It is with these issues in mind, among others, that various aspects of the disclosure were conceived.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

According to one aspect, a system and method for self-programming stimulation settings is provided for configuring, by a computing device, stimulation settings for each electrode in an electrode array in physical contact with a patient, the stimulation settings having adjustable parameters comprising frequency, pulse width, and amplitude. The computing device may obtain feedback information from the patient and automatically adjust at least one of the adjustable parameters based on the feedback information from the patient. In one example, each electrode may have different stimulation settings and be automatically configured by the computing device based on the feedback. In addition, as an example, two of the electrodes of the electrode array may generate electrical impulses at a time based on the automatic configuration to provide treatment to the patient. The patient may provide feedback by pointing to a particular location on their head and the computing device may determine one or more electrodes associated with the particular location. The feedback provided by the patient may indicate unwanted side effects and/or may indicate paresthesia.

In one example, a method may include configuring, by a computing device, stimulation settings for each electrode in an electrode array in physical contact with a patient, the stimulation settings having adjustable parameters comprising frequency, pulse width, and amplitude, obtaining, by the computing device, feedback information from the patient, and automatically adjusting, by the computing device, at least one of the adjustable parameters based on the feedback information from the patient.

In another example, a therapy configuration system may include at least one processor and a memory device in communication with the processor, the at least one processor to configure stimulation settings for each electrode in at least one electrode array in physical contact with a patient, the stimulation settings having adjustable parameters comprising frequency, pulse width and amplitude, obtain physiological feedback information from the patient, and automatically adjust at least one of the adjustable parameters based on the physiological feedback information from the patient.

In another example, a non-transitory computer-readable storage medium may have instructions stored thereon that, when executed by at least one computing device cause the at least computing device to perform operations, the operations comprising configuring stimulation settings for each electrode in an electrode array in physical contact with a patient, the stimulation settings having adjustable parameters comprising frequency, pulse width, and amplitude, obtaining feedback information from the patient, and automatically adjusting at least one of the adjustable parameters based on the feedback information from the patient.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 5 shows an example user interface provided by a conventional system according to an example of the instant disclosure.

DETAILED DESCRIPTION

Figure 1:
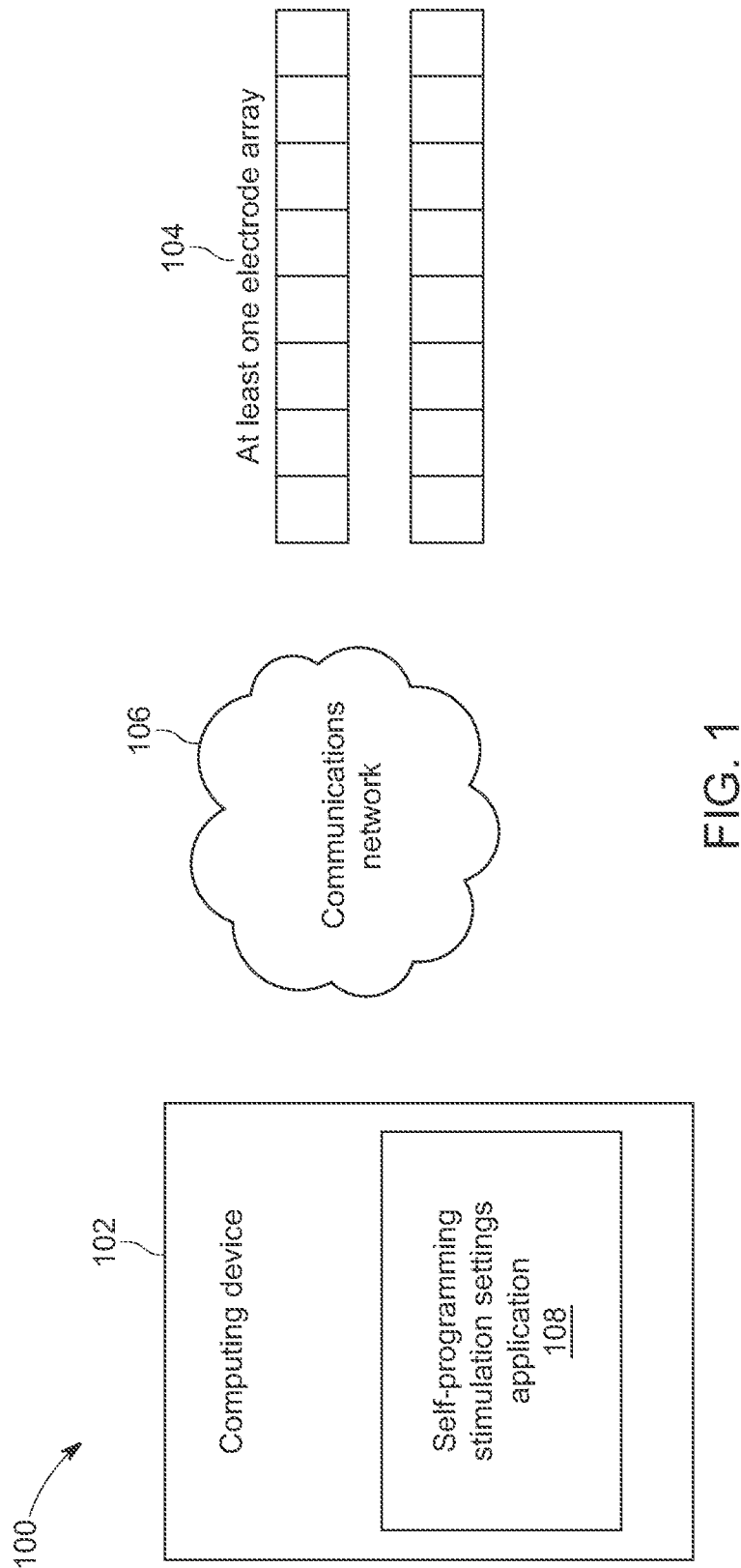
FIG. 1 is a block diagram of a system for self-programming stimulation settings according to an example of the instant disclosure.

A system for self-programming stimulation settings will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, "at least one of A, B, and C" indicates A or B or C or any combination thereof. As used herein, the singular form of a word includes the plural, and vice versa, unless the context clearly dictates otherwise. Thus, the references "a", "an", and "the" are generally inclusive of the plurals of the respective terms.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, ranges are used herein in shorthand, so as to avoid having to list and describe each and every value within the range. Any appropriate value within the range can be selected, where appropriate, as the upper value, lower value, or the terminus of the range.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the description of the invention.

"About" means a referenced numeric indication plus or minus 10% of that referenced numeric indication. For example, the term "about 4" would include a range of 3.6 to 4.4. All numbers expressing quantities of ingredients, reaction conditions, and so forth used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

Conventional approaches to providing neurotherapy are complex and tedious for both patients and those providing care for patients such as nurses. It can be difficult to determine how to best provide therapy for a patient and each patient may be different based on a myriad of factors. In some cases, each patient may go through a trial-and-error approach to determine the best way to receive therapy. The bioelectronic devices may have to be configured for each therapy session and it may take months for a therapeutic effect to be established. Each patient may have to schedule and attend weeks or months of follow-up visits to iteratively adapt and try to arrive at an effective therapy.

Current solutions are time-consuming, complex, and not intuitive. As an example, for each patient, a bioelectronic device may have a plurality of contacts with a patient. Each contact of the bioelectronic device may be selected one at a time or a few at a time may be selected and stimulation settings (e.g., voltage and frequency) are tested with a patient.

Conventionally, a computing device may be held near or against a patient at an implantable pulse generator to transfer associated settings from the computing device to the implantable pulse generator. The patient or caregiver may determine whether paresthesia is felt (and where) and/or adverse events (e.g., pain sensation, muscle recruitment). This may be repeated up to fifty times if there are eight contacts for the implantable pulse generator and repeated at six different current levels. In addition, this may have to be repeated for both occipital nerve stimulation (ONS) and supraorbital nerve stimulation (SONS). Paresthesia may be a "champagne bubbles" sensation experienced by the patient associated with effective therapy.

Follow-up visits may occur every few months and involve a nurse having limited time for repeated setup and configuration procedures. Even further, changes can only be made every few months and the patient cannot optimize as the therapeutic effect unfolds. As an example, it may not be possible to try six different current levels because this could be harmful to the patient and their therapy. Thus, settings for each patient may be suboptimal because they may provide too much stimulation or not enough stimulation.

Currently, the nurse or another operator may select each current value or contact associated with the implantable pulse generator and the patient may provide feedback by indicating paresthesia (associated with therapeutic effect) or side-effects (muscle recruitment or pain). The nurse may have to manually record each instance of feedback. This may be repeated, for example, six times for each current and for each of eight contacts. The nurse may have to manually select each contact and manually adjust the frequency, pulse width, and amplitude. In addition, the nurse may have to indicate whether the patient experienced paresthesia or side effects for each test during setup. This is not efficient for nurses or operators or patients and can be wasteful and ineffective. Patients may experience too much stimulation or too little stimulation and it can take an extremely long time to setup the implantable pulse generator.

According to an example, a self-programming stimulation settings system may include a computing device such as a mobile computing device (e.g., smartphone or tablet device) that may be a patient computing device. The computing device may communicate with at least one electrode array that may be an implantable impulse generator to provide neurostimulation therapy for a patient. The computing device may send settings information to the at least one electrode array based on feedback from the patient and automatically program and configure the at least one electrode array based on the feedback. The feedback may be captured by the computing device using an image capture device associated with the computing device.

As an example, the image capture device may capture a frown provided by the patient or a grimace provided by the patient. Alternatively, the patient may point to a particular location on their head and the computing device may determine one or more electrodes associated with the particular location. The point by the patient may indicate that the patient feels paresthesia or feels side-effects. Alternatively or additionally, the at least one electrode array may register the particular location using capacitive sensing.

The computing device also may capture information or data associated with other biomarkers such as a heart rate of the patient. The heart rate may be determined by the computing device or another device and sent to the computing device. The computing device may generate current using various electrode configurations until paresthesia is confirmed by the patient. In addition, the computing device may store information associated with the electrode configurations in memory or in storage to generate a patient diary or patient history for future use and store configuration for settings that provide good therapy outcomes.

FIG. 1 illustrates a block diagram of a self-programming stimulation settings system 100 according to an example embodiment. The self-programming stimulation settings system 100 may include at least one computing device 102 that communicates with at least one electrode array 104 via a communication network 106. The at least one electrode array 104 may have one or more contacts that may be implanted in a patient. The at least one electrode array 104 may be an implantable pulse generator and as an example each array may have eight electrodes or a different number of electrodes. The at least one computing device 102 may be one or more computing devices, a virtual machine, a container, or another type of packager that may be capable of executing one or more programs or applications. The at least one computing device 102 may execute a self-programming stimulation settings application 108 using at least one processor.

The self-programming stimulation settings application 108 may be a component of an application and/or service executable by the computing device 102 and/or at least one server computing device. For example, the self-programming stimulation settings application 108 may be a single unit of deployable executable code or a plurality of units of deployable executable code. According to one aspect, the self-programming stimulation settings application 108 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others. The server computing device may be a single server, however it is contemplated that the at least one server computing device may include multiple servers, for example, in a cloud computing configuration. Additionally, the at least one server computing device is configured to receive data and/or transmit data to the at least one computing device 102 through the communication network 106.

The communication network 106 can be the Internet, an intranet, or another wired or wireless communication network. For example, the communication network 106 may include a Mobile Communications (GSM) network, a code division multiple access (CDMA) network, $3^{rd}$ Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

The at least one computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the self-programming stimulation settings application 108. In addition, the at least one computing device further includes at least one communications interface to transmit and receive communications, messages, and/or signals.

The computing device 102 may have and/or communicate with a relational database management system (RDBMS) or another type of database management system that stores and communicates data from at least one database. The data stored in the at least one database may be patient information as well as stimulation settings information for at least one patient, among other data.

Figure 2:
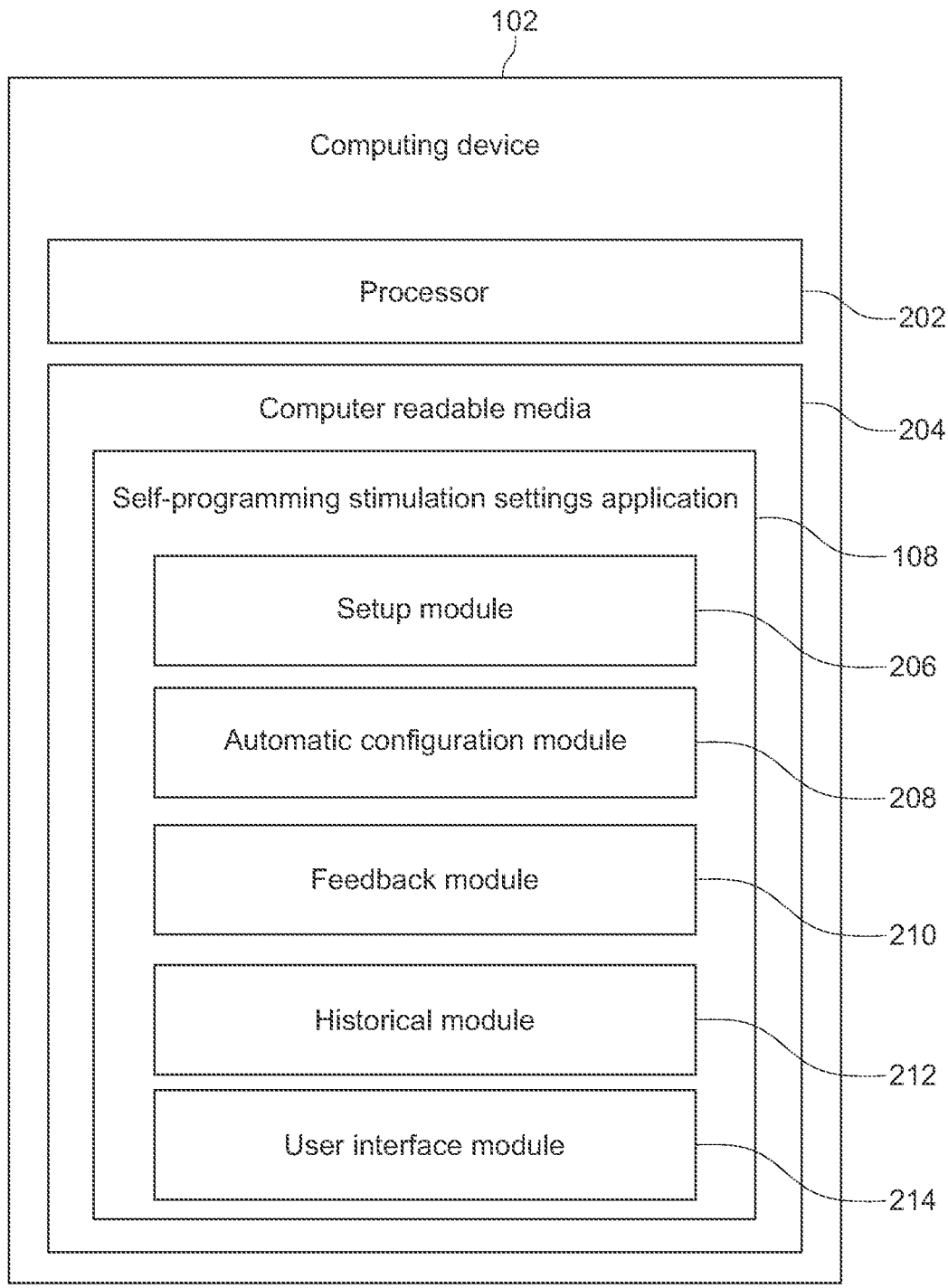
FIG. 2 is a block diagram of a computing device having a self-programming stimulation settings application according to an example of the instant disclosure.

FIG. 2 illustrates a block diagram of the computing device 102 according to an example embodiment. The computing device 102 includes computer readable media (CRM) 204 in memory on which the self-programming stimulation settings application 108 or other user interface or application is stored. The computer readable media may include volatile media, nonvolatile media, removable media, non-removable media, and/or another available medium that can be accessed by the processor 202. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The self-programming stimulation settings application 108 may include a setup module 206 for setting up one or more patients to use the self-programming stimulation settings application 108 with the system 100. As an example, a patient, a nurse, or another user may input patient information such as a username and/or password to use the self-programming stimulation settings application 108, a patient name, a date of birth, a gender, a primary indication (e.g., migraine), a patient ID, an implantation date, and/or other setup information. The setup module 206 may store the patient information in memory of the computing device 102, in a local database, or transmit the patient information to a server computing device for storage at the server computing device and/or a database associated with the server computing device. Initially, the patient may begin setup at a clinic or at a physician's office, among other locations. The nurse, patient, or another user may set safe current limits for each contact associated with the at least one electrode array 104.

In addition, the self-programming stimulation settings application 108 may include an automatic configuration module 208 for automatically configuring each contact for each of the at least one electrode array 104. This may occur at a home of the patient, e.g., outside care at a clinic or physician's office, or another location. Each electrode may randomly provide 0.5 mA to each contact in each electrode array 104. The automatic configuration module 208 may increase to 1.0 mA and repeat for 1.5 mA, 2.0 mA, etc. until feedback has been collected for all contacts associated with the at least one electrode array 104.

As an example, when increasing the current for a selected contact pair of electrodes, (e.g. 0.5 mA to 1.0 mA to 1.5 mA) the patient can be asked to point when he/she feels the stimulation (e.g. at 1.0 mA). The perception threshold is relevant because it may be an indicator for nerves that are well targeted with certain electrodes. In addition, the patient may be asked to point when he/she feels the paresthesia running up the skull. This may be associated with good therapeutic outcomes when the paresthesia covers most of the head from the electrodes up to the top of the head (e.g. at 1.5 mA). The current needed for full therapeutic effect is relevant as it may provide settings that are expected to have the most therapeutic effect. The patient may be asked to point when he/she exhibits muscle recruitment (e.g. at 6 mA). Ideally, muscle recruitment only occurs at much higher currents than what is needed for therapy. In addition, the patient may be asked to point when he/she feels a pain/uncomfortable sensation (e.g. 9 mA). The programming nurse could measure once in the hospital and program the limits of the self-programming to always be below the pain threshold. Ideally, a pain sensation only occurs at much higher currents than what is needed for therapy.

The self-programming stimulation settings application 108 may include a feedback module 210 for receiving feedback from the computing device 102 via input from the patient and/or other devices. As the automatic configuration module 208 automatically configures and provides 0.5 mA via one or more of the electrodes (usually two at a time that may be selected randomly) on the at least one electrode array 104, the patient may provide feedback by pointing to a location of response on their head. As an example, the patient may point to one or more zones on their head such as a front of the head, a back of the head, a top of the head, a bottom of the head, a left side of the head, and a right side of the head, among other zones.

The feedback module 210 may determine the location of the response using an imaging device associated with the computing device 102 such as one or more cameras of the computing device. In addition, the patient may provide feedback by selecting a user interface element that may be displayed by a display of the computing device 102 and indicating a response as one of paresthesia and a side effect. Alternatively, the patient may provide feedback by pressing a button, or via automatic speech recognition. Contacts that provide paresthesia while not triggering side-effects may be selected as proposed programming settings.

Additionally, the feedback module 210 may obtain biomarker information using the imaging device associated with the computing device 102 such as determining that the patient is frowning, an eye is blinking, or the patient is grimacing, among others. The imaging device and/or another hardware device such as a heart rate monitor in communication with the computing device 102 may obtain other biomarkers such as a change in heart rate of the patient that is an indication of stimulation threshold beyond which stimulation may be felt.

The self-programming stimulation settings application 108 may include a historical module 212 for storing information associated with treatment settings for each of the one or more patients that use the self-programming stimulation settings application 108. As an example, for each therapy session, the historical module 212 may store historical information such as a date, time, programming settings for each contact for each electrode of the at least one electrode array 104, and a response (e.g., paresthesia or side effect). The historical information also may be known as a headache diary. The historical information may be stored in memory of the computing device 102, in a local database, or transmit the patient information to a server computing device for storage at the server computing device and/or a database associated with the server computing device.

The self-programming stimulation settings application 108 may provide a graphical user interface (GUI) using a user interface module 214 for displaying a user interface on a display device. As an example, the user interface module 214 generates a native and/or web-based graphical user interface (GUI) that accepts input and provides output viewed by users of the computing device 102. The computing device 102 may provide realtime automatically and dynamically refreshed patient information and self-programming stimulation settings information. The user interface module 214 may send data to other modules of the self-programming stimulation settings application 108 of the computing device 102, and retrieve data from other modules of the self-programming stimulation settings application 108 of the computing device 102 asynchronously without interfering with the display and behavior of the user interface displayed by the computing device 102.

Figure 3:
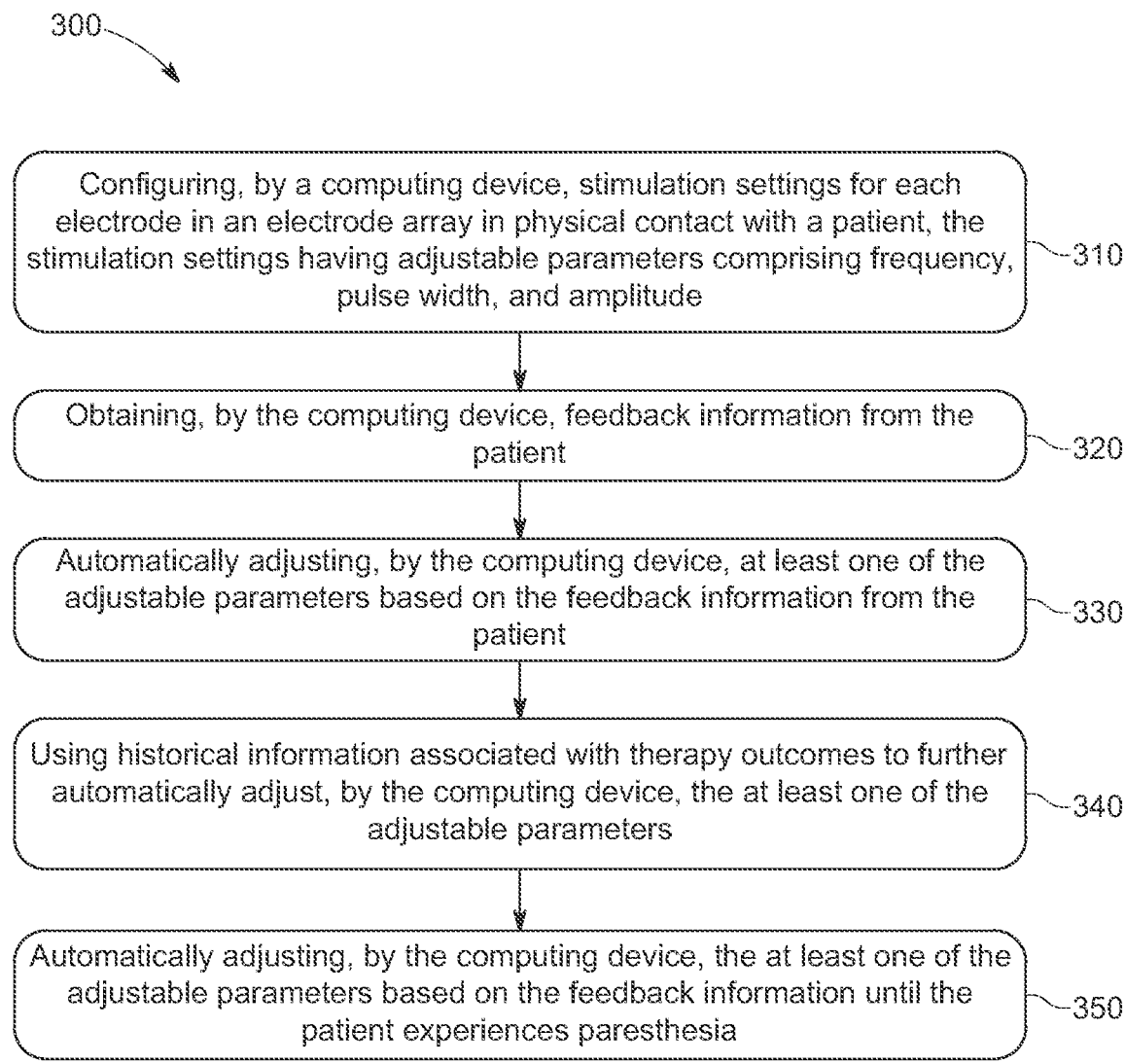
FIG. 3 is a flowchart of a method for self-programming stimulation settings by the system according to an example of the instant disclosure.

FIG. 3 illustrates an example method 300 for executing one or more functions provided by the self-programming stimulation settings application 108. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes configuring, by the computing device 102, stimulation settings for each electrode in the at least one electrode array 104 in physical contact with the patient at block 310. The stimulation settings may have adjustable parameters including frequency, pulse width, and amplitude, among others. As an example, the at least one electrode array 104 may provide one of occipital nerve stimulation (ONS) and/or supraorbital nerve stimulation (SONS). The at least one electrode array may be implanted at one of a forehead and a base of the skull of the patient, among other locations. As an example, higher electrode placement is possible. For SONS, the electrodes may be implanted just above the eyebrows or even higher such near the hairline of the patient. The at least one electrode array 104 may have eight electrodes or a different number of electrodes.

According to some examples, the method 300 includes obtaining, by the computing device 102, feedback information from the patient, at block 320. As an example, this may include capturing the feedback information using at least one imaging device, e.g., one or more cameras of the computing device 102. As another example, this may include capturing the feedback information using the at least one imaging device of the computing device 102 to determine a finger of the patient pointing to a particular location on the patient, e.g., a front/back of the head, top/bottom of the head, left side/right side of the head, among other locations. Even further, this may include capturing facial information from a face of the patient obtained by the at least one imaging device of the computing device 102. The facial information may be a frown, a smile, a blinking eye, a grimace, or another type of information or indication provided by the patient.

As an example, the feedback information may be physiological feedback information, and the method 300 may further include capturing the physiological feedback information using heart rate, blood flow, or blood pressure monitoring by the computing device 102. Alternatively, the physiological feedback may be muscle recruitment or muscle activation. The heart rate of the patient may be determined by processing image information from the one or more imaging devices of the computing device 102 or from a separate heart rate monitor in communication with the computing device 102.

According to some examples, the method 300 includes automatically adjusting, by the computing device 102, at least one of the adjustable parameters based on the feedback information from the patient at block 330.

According to some examples, the method 300 includes using historical information associated with therapy outcomes to further automatically adjust, by the computing device 102, the at least one of the adjustable parameters at block 340. In some examples, this may include utilizing a model based on historical information from anonymized patient information based on one of machine learning and artificial intelligence to automatically adjust the at least one of the adjustable parameters.

According to some examples, the method 300 includes automatically adjusting, by the computing device 102, the at least one of the adjustable parameters based on the feedback information until the patient experiences paresthesia at block 350.

As an example, the method 300 may include determining the patient experiences paresthesia based on image information obtained by the at least one imaging device of the computing device 102. Even further, the method 300 may include receiving feedback from the patient.

The feedback may be input provided to a touch screen interface provided by a display of the computing device 102, the feedback including a selection of one of a paresthesia user interface element and a side-effect user interface element. The method 300 may further include setting the at least one of the adjustable parameters based on the feedback from the patient.

The method 300 may include determining particular stimulation settings that provide a minimum number of side effects and provide a maximum paresthesia for the patient and automatically adjusting the at least one of the adjustable parameters using the particular stimulation settings.

According to some examples, the method 300 includes configuring the stimulation settings for at least two electrodes in the at least one electrode array 104 at a time, e.g., 1 and 2, 3 and 4, 5 and 6, and 7 and 8 as well as other combinations of two of the electrodes. Additionally, the method 300 may include randomly repeatedly configuring the stimulation settings by increasing a stimulation amplitude by a particular amount until reaching a maximum amount for at least two electrodes in the at least one electrode array.

The method 300 may further include configuring the stimulation settings for at least two electrodes in the at least one electrode array 104, a first set of electrodes in the at least two electrodes associated with a first zone that stimulates a first region on a face of the patient and a second set of electrodes in the at least two electrodes associated with a second zone that stimulates a second region different from the first region on the face of the patient. The first region may be associated with a left side of the face and the second region may be associated with a right side of the face. Additionally, each region may extend vertically towards a top half of the head, which is associated with good therapeutic outcomes. As an example, one of the first region and the second region may be associated with paresthesia that runs up to a top of a head of the patient. Other regions are possible based on a combination/overlap of these regions.

In other words, the method 300 may include ramping up stimulation amplitudes while randomly selecting electrodes until the patient indicates feeling paresthesia.

The electrodes may be selected for stimulation that provide paresthesia for small amplitudes, while saving battery power and inducing a minimum amount side-effects (e.g., frowning/blinking) as possible.

In addition, stimulation may be done for multiple zones (e.g. left and right side of the forehead) to arrive at a wide paresthesia coverage across the front or back of the head.

The method 300 may further include registering the at least one electrode array 104 by registering at least one finger of the patient with a capacitive sensor device of the electrode array.

As an example, the method 300 may include matching camera registration with a registration of the finger using capacitive sensing by the implant, e.g., the at least one electrode array 104. Alternatively, the method 300 may include capturing an external measurement tape extending from the external pulse generator location along an implantation trajectory.

In other words, the system 100 may generate currents across various electrode configurations until paresthesia is confirmed by the patient. The patient may point to a particular location on the head where the patient may feel paresthesia. This may be registered by the imaging device of the computing device 102, e.g., smartphone or by capacitive sensing via the electrodes that are used to stimulate the patient. Consistency may be checked by reapplying previously noticed stimuli and/or by correlating sensed finger position as captured by the imaging device of the computing device and using capacitive sensing. The system 100 may capture side effects such as muscle recruitment to identify contacts that may provide strong or robust paresthesia with minimal electrical power while maintaining below muscle recruitment levels.

Figure 4:
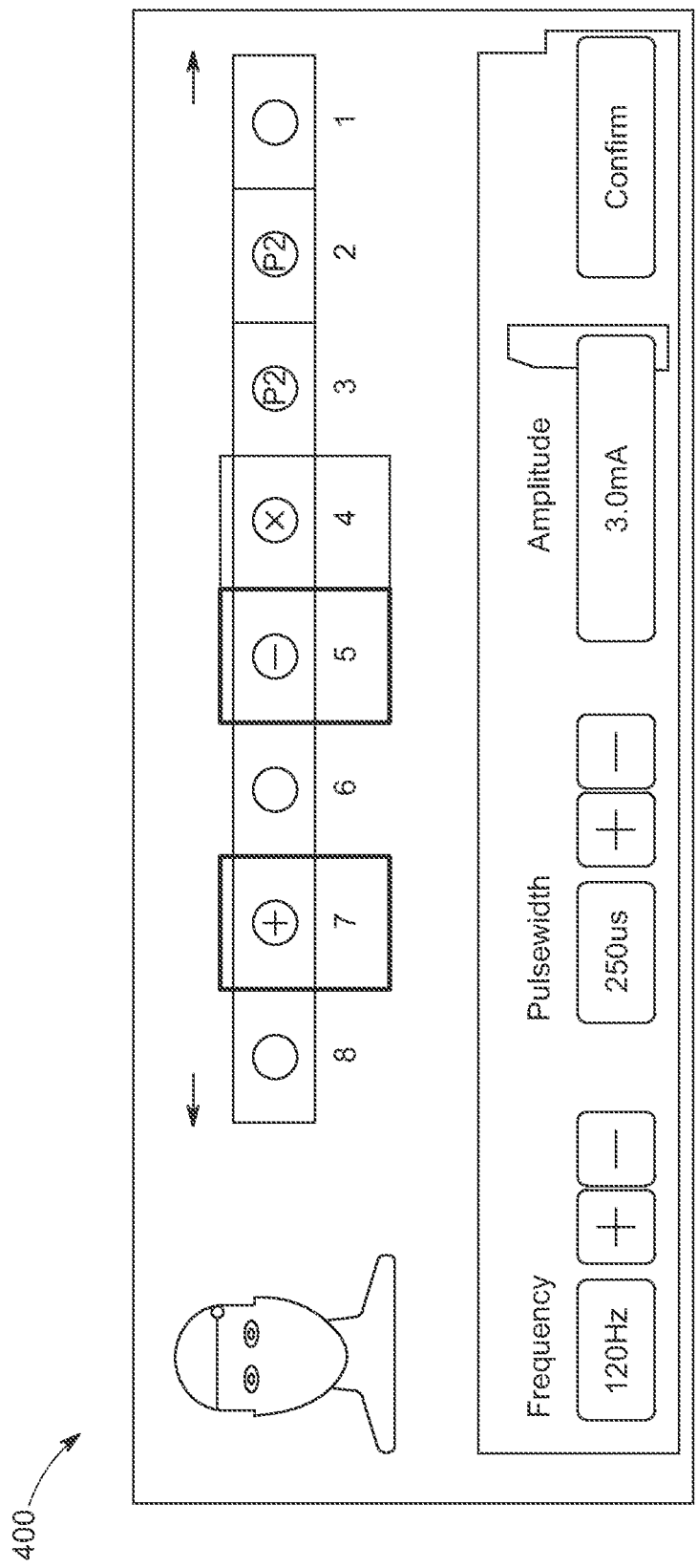
FIG. 4 shows an example user interface provided by a conventional system according to an example of the instant disclosure.

FIG. 4 shows an example user interface 400 provided by a conventional system. A nurse may have to iteratively select active contacts and stimulation settings. In such a conventional system, settings may be programmed or set by holding an external device such as a computing device that may display the user interface close to the implant to transfer the settings over a network. As shown in FIG. 4, a nurse would have to individually select each electrode by selecting electrode one, electrode two, electrode three, electrode four, electrode five, electrode six, electrode seven, and electrode eight, and then also set a frequency, pulse width, and amplitude for each selected electrode and then select confirm. In FIG. 4, "+" indicates that the electrode acts as ground and "−" indicates that the electrode stimulates.

This would have to be repeated dozens of times to determine the best configurations to provide therapy for the patient. This system was difficult to use, clunky, and inefficient. The nurse may have had to repeat the setup and configuration for each of the contacts and then also repeat the setup for both ONS and SONS. In addition, the setup would have to be repeated every few months.

Figure 5:
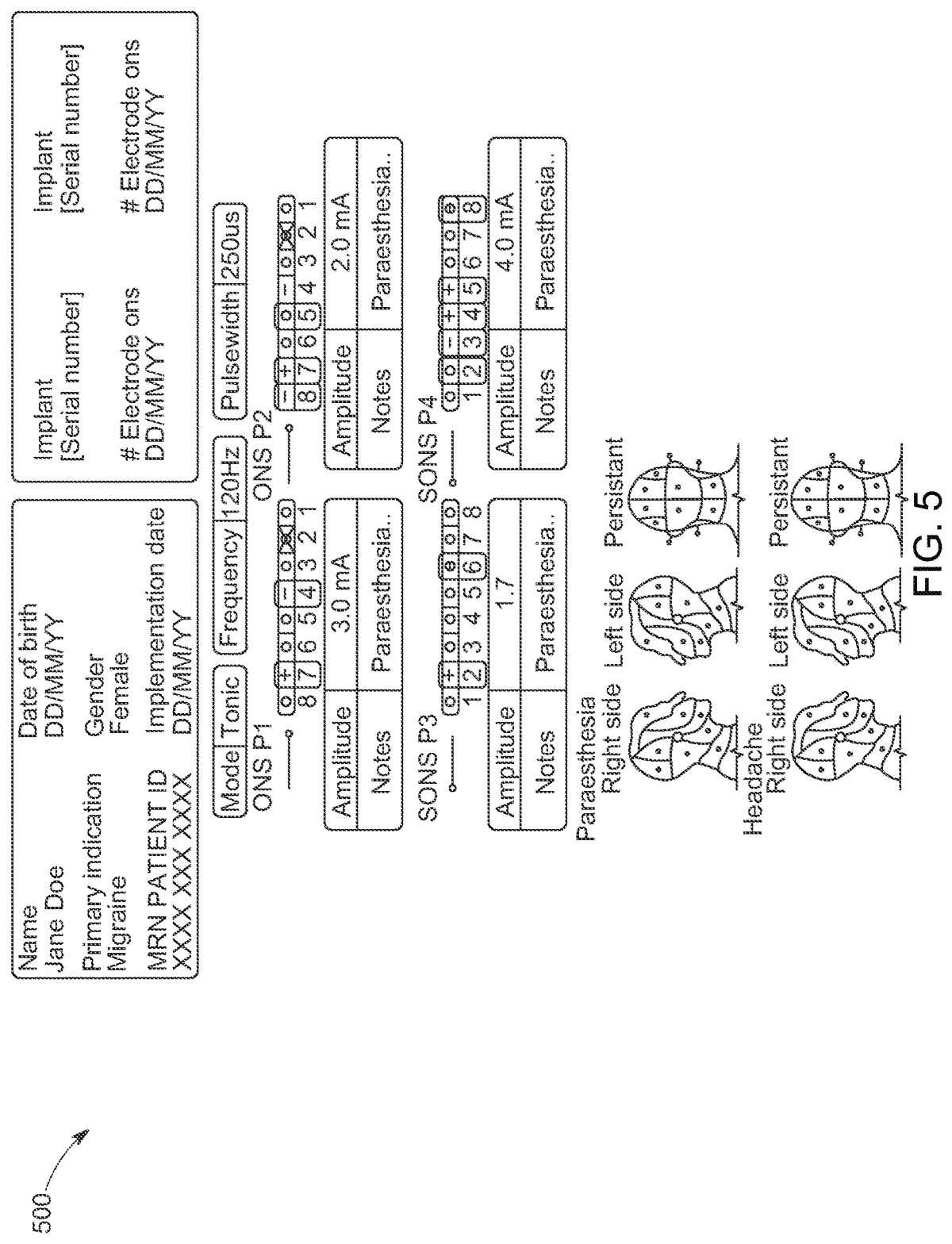

FIG. 5 shows another example user interface 500 provided by a conventional system. As shown in FIG. 5, the user interface may be a graphical user interface (GUI) that provides patient information such as a name, a date of birth, a primary indication (e.g., migraine), gender (e.g., male or female), a patient identifier, an implantation date, an implant serial number, electrode ONS information (e.g., a date), and electrode ONS information (e.g., a date).

The mode may be set to be tonic, the frequency may be set to 120 Hz, and the pulse width may be set to 250 microseconds. "+" indicates that the electrode acts as ground and "−" indicates that the electrode stimulates.

FIG. 5 illustrates the trial-and-error approach to select contacts. For each contact configuration, the amplitude may be varied until the patient feels paresthesia (e.g., champagne bubbles sensation associated with effective therapy), muscle recruitment (e.g., pulse frowning or blinking with the eye), or an unpleasant sensation (e.g., the current is too strong). The therapeutic effect may take months to be established and follow up visits may be planned to iterative adapt and try again to arrive at an effective therapy.

As further shown in FIG. 5, there is an ONS P1 configuration, an ONS P2 configuration, a SONS P3 configuration, and a SONS P4 configuration. The ONS P1 configuration indicates that electrode seven and electrode four are utilized, an amplitude is set at 3.0 mA, and there was paresthesia. The ONS P2 configuration shows that electrodes eight, seven, and five are utilized, the amplitude is set at 2.0 mA, and there was paresthesia. The SONS P3 configuration indicates that electrodes two and six are utilized, an amplitude is set at 1.7 mA, and there was paresthesia. The SONS P4 configuration shows that electrodes three, four, five, and eight are utilized, the amplitude is set at 4.0 mA, and there was paresthesia.

Figure 6:
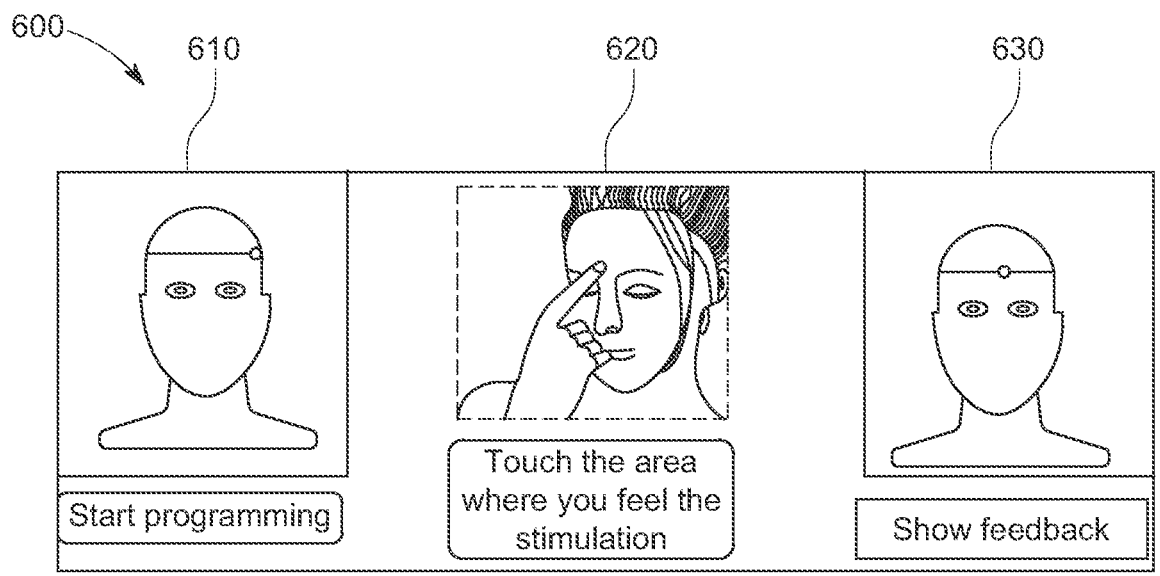
FIG. 6 shows another flowchart of the method for self-programming stimulation settings by the system according to an example of the instant disclosure.

FIG. 6 shows another flowchart 600 of the method for self-programming stimulation settings by the system 100 according to an example of the instant disclosure. As shown in FIG. 6, random locations may be selected while amplitude of the current is gradually increased from 0.1 mA up to a current that is felt by the patient. This may be repeated for the left side of the head/the right of the head as well as front of the head/the back of the head. Measurements may be confirmed by the system 100 to verify consistent user feedback.

First, in step 610, the nurse and/or the patient may begin programming and setting up the stimulation settings for the at least one electrode array. As an example, this may include configuring, by the computing device 102, stimulation settings for each electrode in the at least one electrode array 104 in physical contact with the patient. The stimulation settings may have adjustable parameters including frequency, pulse width, and amplitude, among others.

Next, in step 620, this may include automatically adjusting, by the computing device 102, at least one of the adjustable parameters based on the feedback information from the patient. In one example, the patient may touch an area when and where they feel the stimulation and the computing device 102 may determine one or more electrodes associated with the area touched by the patient using the computing device 102 and capacitive sensing. As an example, the electrode lead may measure a change in impedance due to tissue change when a finger is near the electrode array. In addition, the computing device may capture patient feedback by registering a finger on the head in a particular location. The computing device may determine an effect size based on indicated paresthesia whereby the higher it runs up the head, the better. In addition, the computing device 102 may select the contacts that provide paresthesia having a smallest current.

In step 630, the feedback may be shown by indicating on a user interface a representation of where the user indicated that they felt the stimulation. As shown in 630, the patient pointed to a center of their head and this may be indicated on a graphical user interface (GUI) shown on a display of the computing device 102.

In one example, the patient may select a "Start" button displayed on a GUI shown on a display of the computing device 102 to begin self-programming. At a randomly selected contact or electrode in the at least one electrode array 104, a small negative current (e.g., 0.5 mA) may be provided with two neighboring electrodes ("+") acting as return. So the pattern may be: "+−+0 0 0 0 0 0" or "0 0+−+0 0 0 0" or in case the "−" is at the edge of the array: "−++0 0 0 0 0". The nerves of the patient may be triggered by a negative current so the "−" electrode triggers the nerve.

The current may be increased in steps (e.g., steps of 0.5 mA) until the patient indicates that he/she feels the stimulation (e.g., paresthesia). Preferably, the patient may indicate how high the paresthesia is felt or even more preferably, the patient may indicate an area where the paresthesia is felt. When a main branch is triggered, the paresthesia is felt from that point upwards including where all the branches are. The area where the paresthesia is felt may be indicated by the patient by drawing a region on his/her forehead around the area where paresthesia is felt and this area may be determined by the imaging device of the computing device 102. Alternatively this may be drawn on an image of a head in the user interface.

Next another contact is selected, and the process is repeated for each contact in the at least one electrode array 104 until all contacts have been used.

To cover the whole forehead (or back of the head) of the patient, next contacts are chosen by the self-programming stimulation settings application 108 of the computing device 102 that cover a large vertical area, and several contacts are selected such that together they cover the full width of the forehead/back of the head. Since there may be several combinations of selected contacts and amplitudes, as another example, the self-programming stimulation settings application 108 may present candidate stimulation settings shown on the GUI shown on the display of the computing device. The candidate stimulation settings may include different selectable contacts, amplitudes, or frequencies. The patient can choose and select settings that provides the best coverage across the whole forehead/back of the head.

In another example, the self-programming stimulation settings application 108 may present another settings GUI and the patient may select different electrode configurations such as e.g. "0+−−+0 0 0" or "++−−++0 0".

In other words, to begin the self-programming by the self-programming stimulation settings application 108, the user may select a start button or user interface element displayed on a display of the computing device 102.

After selecting the start button, the GUI may display a user interface element or button that may include text such as "Select when you feel stimulation" and the user may use their finger, stylus, or other input mechanism to draw an area around a stimulated area such as a portion/region on the head. This may be repeated up to eight times or the number of electrodes/contacts for each electrode in the at least one electrode array 104.

After repeating this process for each of the electrodes in the at least one electrode array 104, the GUI may display a notification that indicates that candidate therapy settings have been prepared. The user may select a "Start" user interface element or button to select the best therapy settings. Alternatively, the GUI may display more than one candidate therapy settings such as a "Setting One" and a "Setting Two."

By selecting the "Setting One" user interface element, the self-programming stimulation settings application 108 may play or execute the "Setting One" and stimulate using those therapy settings. By selecting the "Setting Two" user interface element, the self-programming stimulation settings application 108 may play or execute the "Setting Two" and stimulate using those therapy settings. The user may select one of the settings and save it as a favorite for future use and execution. The GUI also may display a history of recently played settings and the user may select one of the most recently played settings.

Figure 7:
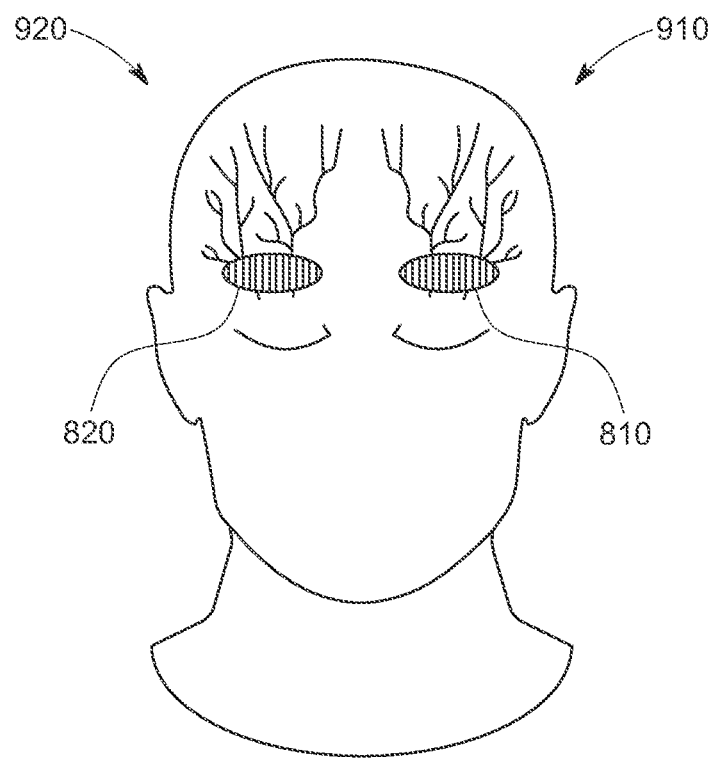
FIG. 7 and FIG. 8 depict examples of nerves that may be stimulated using an improved implantable medical device to treat headaches according to an example of the instant disclosure.
Figure 8:
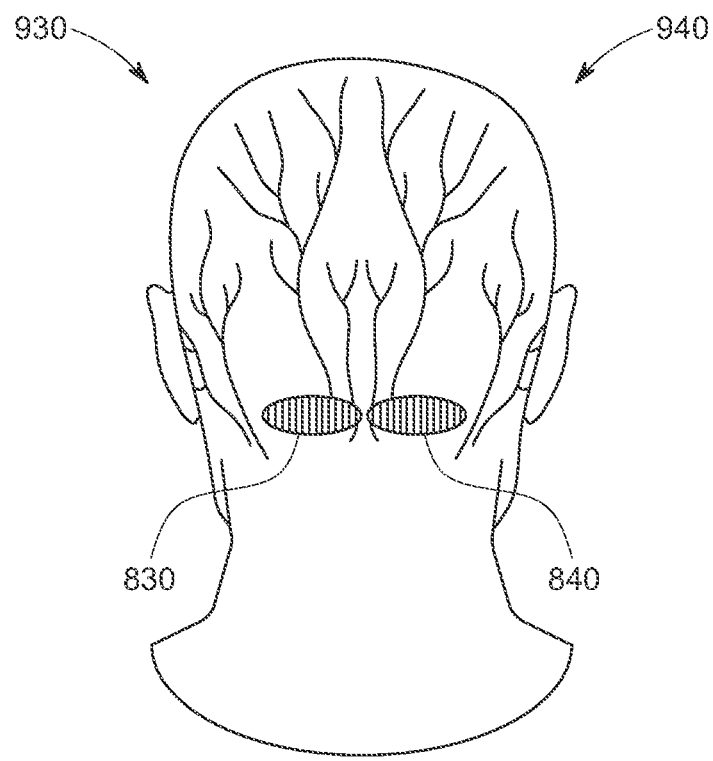

FIG. 7 and FIG. 8 depict examples of nerves that may be stimulated using the at least one electrode array 104, configured to provide neurostimulation to treat, for example, headaches or primary headaches. In particular, if a substrate associated with the at least one electrode array 104 is substantially flexible, it may conform better to the curved surfaces of the head and/or skull. This means that the comfort to the user of having the at least one electrode array 104 that may be implanted within the user may be increased.

FIG. 7 depicts the left supraorbital nerve 910 and right supraorbital nerve 920 which may be electrically stimulated using a suitably configured device. FIG. 8 depicts the left greater occipital nerve 930 and right greater occipital nerve 940 which may also be electrically stimulated using a suitably configured device.

Depending on the size of the region to be stimulated and the dimensions of the part of the device to be implanted, a suitable location is determined to provide the electrical stimulation required for the treatment. Approximate implant locations for the part of the stimulation device comprising stimulation electrodes are depicted as regions:

location 810 for left supraorbital stimulation and location 820 for right supraorbital stimulation for treating chronic headache such as migraine and cluster.

location 830 for left occipital stimulation and location 840 for right occipital stimulation for treating chronic headache such as migraine, cluster, and occipital neuralgia.

In many cases, these will be the approximate locations 810, 820, 830, 840 for the implantable medical device 110.

For each implant location, 810, 820, 830, 840 a separate stimulation device such as an electrode of the at least one electrode array 104 may be used. Where implant locations 810, 820, 830, 840 are close together, or even overlapping, a single stimulation device may be configured to stimulate at more than one implant location 810, 820, 830, 840.

A plurality of implantable medical devices such as the at least one electrode array 104 may be operated separately, simultaneously, sequentially or any combination thereof to provide the required treatment.

Figure 9:
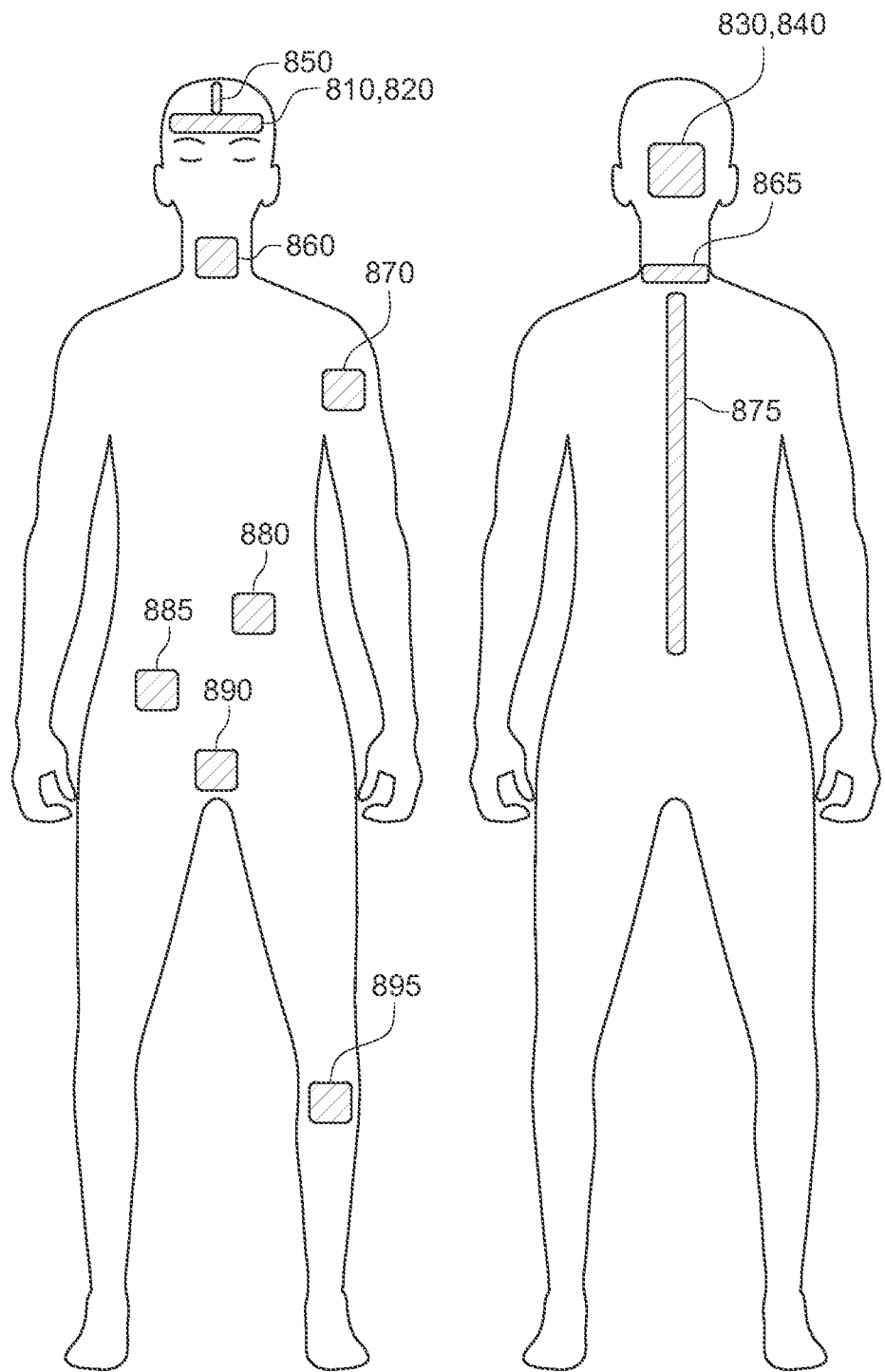
FIG. 9 depicts examples of nerves that may be stimulated for other treatments according to an example of the instant disclosure.

FIG. 9 depicts further examples of nerves that may be stimulated using a suitably configured improved implantable medical device such as the at least one electrode array 104 to provide neurostimulation to treat other conditions. The locations depicted in FIG. 7 and FIG. 8 (810, 820, 830, 840) are also depicted in FIG. 9.

Depending on the size of the region to be stimulated and the dimensions of the part of the device to be implanted, a suitable location is determined to provide the electrical stimulation required for the treatment. Approximate implant locations for the part of the stimulation device comprising stimulation electrodes are depicted as regions:

location 810 for cortical stimulation for treating epilepsy;

location 850 for deep brain stimulation for tremor control treatment in Parkinson's disease patients; treating dystonia, obesity, essential tremor, depression, epilepsy, obsessive compulsive disorder, Alzheimer's, anxiety, bulimia, tinnitus, traumatic brain injury, Tourette's, sleep disorders, autism, bipolar; and stroke recovery;

location 860 for vagus nerve stimulation for treating epilepsy, depression, anxiety, bulimia, obesity, tinnitus, obsessive compulsive disorder and heart failure;

location 860 for carotid artery or carotid sinus stimulation for treating hypertension;

location 860 for hypoglossal & phrenic nerve stimulation for treating sleep apnea;

location 865 for cerebral spinal cord stimulation for treating chronic neck pain;

location 870 for peripheral nerve stimulation for treating limb pain, migraines, extremity pain;

location 875 for spinal cord stimulation for treating chronic lower back pain, angina, asthma, pain in general;

location 880 for gastric stimulation for treatment of obesity, bulimia, interstitial cystitis;

location 885 for sacral & pudendal nerve stimulation for treatment of interstitial cystitis;

location 885 for sacral nerve stimulation for treatment of urinary incontinence, fecal incontinence;

location 890 for sacral neuromodulation for bladder control treatment; and location 895 for fibular nerve stimulation for treating gait or footdrop.

In addition, other nerves in the head such as the auricular nerve, facial nerve, mandibular nerve, transverse cervical nerve, lesser occipital nerve, infraorbital nerve, or the auriculotemporal nerve may be stimulated for treating headache disorders, epilepsy or severe autism.

Figure 10:
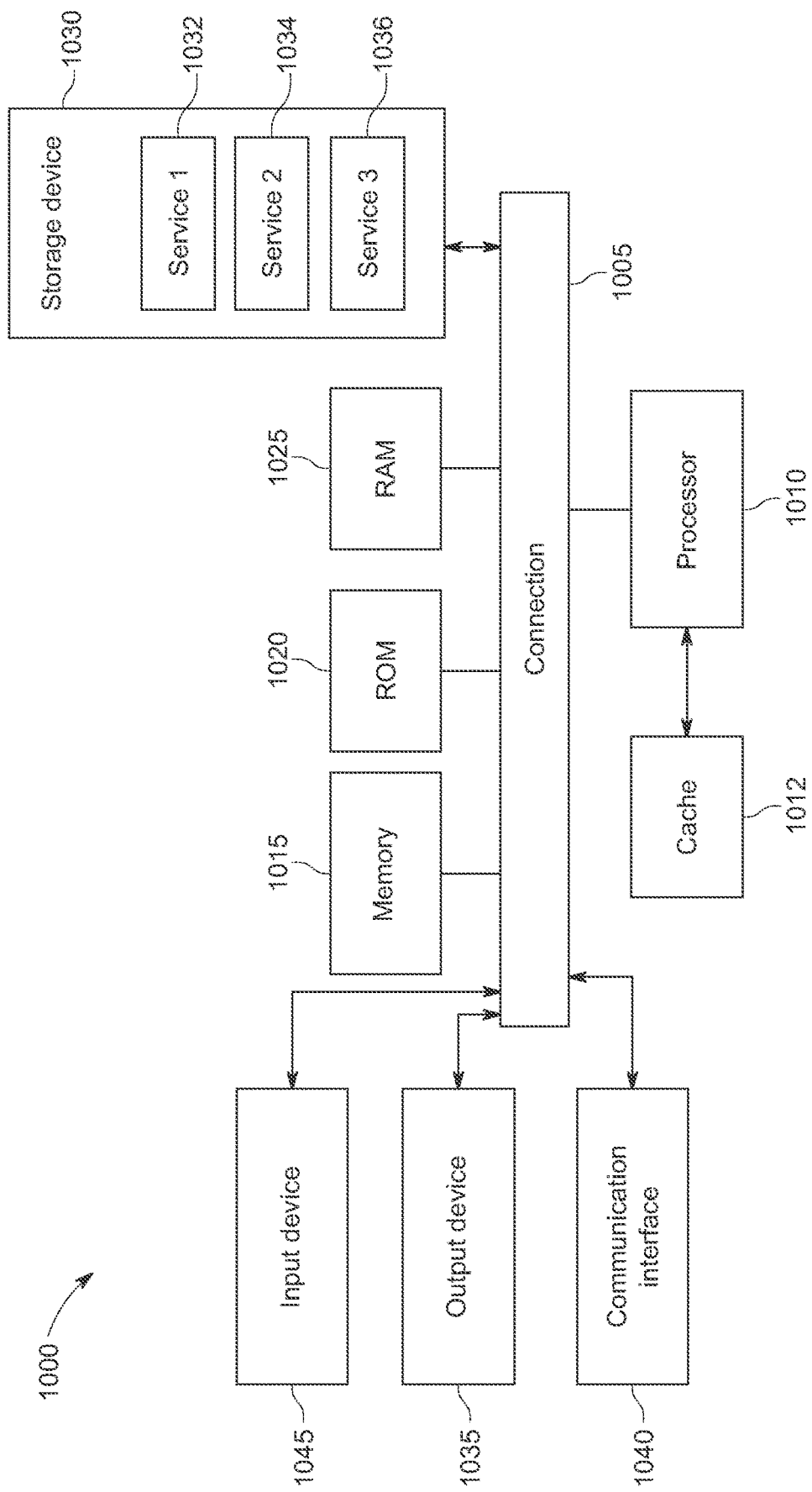
FIG. 10 shows an example of a system for implementing certain aspects of the present technology.

FIG. 10 shows an example of computing system 1000, which can be for example any computing device making up the computing device 102, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising: configuring, by a computing device, stimulation settings for each electrode in an at least one electrode array in physical contact with a patient, the stimulation settings having adjustable parameters comprising frequency, pulse width, and amplitude, obtaining, by the computing device, feedback information from the patient, and automatically adjusting, by the computing device, at least one of the adjustable parameters based on the feedback information from the patient.

Aspect 2: The method of Aspect 1, further comprising capturing the feedback information using at least one imaging device of the computing device.

Aspect 3: The method of Aspects 1 and 2, further comprising wherein the particular interval of time is every two weeks from a time associated with the transaction request.

Aspect 4: The method of any of Aspects 1 to 3, further comprising capturing facial information from a face of the patient obtained by the at least one imaging device of the computing device.

Aspect 5: The method of any of Aspects 1 to 4, wherein the facial information comprises one of a frown of the patient and a blinking of an eye of the patient.

Aspect 6: The method of any of Aspects 1 to 5, wherein the feedback information comprises physiological feedback information, the method further comprising capturing the physiological feedback information using heart rate monitoring by the computing device.

Aspect 7: The method of any of Aspects 1 to 6, further comprising using historical information associated with therapy outcomes to automatically adjust the at least one of the adjustable parameters.

Aspect 8: The method of any of Aspects 1 to 7, further comprising automatically adjusting the at least one of the adjustable parameters based on the feedback information until the patient experiences paresthesia.

Aspect 9: The method of any of Aspects 1 to 8, further comprising determining the patient experiences paresthesia based on image information obtained by at least one imaging device of the computing device.

Aspect 10: The method of any of Aspects 1 to 9, wherein the at least one electrode array provides occipital nerve stimulation (ONS).

Aspect 11: The method of any of Aspects 1 to 10, wherein the at least one electrode array provides supraorbital nerve stimulation (SONS).

Aspect 12: The method of any of Aspects 1 to 11, wherein the at least one electrode array is implanted at one of a forehead and a base of the skull of the patient.

Aspect 13: The method of any of Aspects 1 to 12, wherein the at least one electrode array comprises eight electrodes.

Aspect 14: The method of any of Aspects 1 to 13, further comprising receiving feedback from the patient, the feedback comprising input provided to a touch screen interface provided by a display of the computing device, the feedback comprising a selection of one of paresthesia and a side-effect.

Aspect 15: The method of any of Aspects 1 to 14, further comprising setting the at least one of the adjustable parameters based on the feedback from the patient.

Aspect 16: The method of any of Aspects 1 to 15, further comprising configuring the stimulation settings for at least two electrodes in the at least one electrode array.

Aspect 17: The method of any of Aspects 1 to 16, further comprising registering the at least one electrode array by registering at least one finger of the patient with a capacitive sensor device of the at least one electrode array.

Aspect 18: The method of any of Aspects 1 to 17, further comprising randomly repeatedly configuring the stimulation settings by increasing a stimulation amplitude by a particular amount until reaching a maximum amount for at least two electrodes in the electrode array.

Aspect 19: The method of any of Aspects 1 to 18, further comprising configuring the stimulation settings for at least two electrodes in the electrode array, a first set of electrodes in the at least two electrodes associated with a first zone that stimulates a first region on a face of the patient and a second set of electrodes in the at least two electrodes associated with a second zone that stimulates a second region different from the first region on the face of the patient.

Aspect 20: The method of any of Aspects 1 to 19, wherein the first region is associated with a left side of the face and the second region is associated with a right side of the face.

Aspect 21: The method of any of Aspects 1 to 20, wherein one of the first region and the second region is associated with paresthesia that runs up to a top of a head of the patient.

Aspect 22: The method of any of Aspects 1 to 21, further comprising determining particular stimulation settings that provide a minimum number of side effects and provide a maximum paresthesia for the patient and automatically adjusting the at least one of the adjustable parameters using the particular stimulation settings.

Aspect 23: A therapy configuration system comprising: a processor and a memory device in communication with the processor, the processor to: configure stimulation settings for each electrode in at least one electrode array in physical contact with a patient, the stimulation settings having adjustable parameters comprising frequency, pulse width and amplitude, obtain physiological feedback information from the patient, and automatically adjust at least one of the adjustable parameters based on the physiological feedback information from the patient.

Aspect 24: A non-transitory computer-readable storage medium, having instructions stored thereon that, when executed by at least one computing device cause the at least one computing device to perform operations, the operations comprising configuring stimulation settings for each electrode in an at least one electrode array in physical contact with a patient, the stimulation settings having adjustable parameters comprising frequency, pulse width, and amplitude, obtaining feedback information from the patient, and automatically adjusting at least one of the adjustable parameters based on the feedback information from the patient.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method comprising:
configuring, by a computing device, stimulation settings for each electrode in an at least one electrode array in physical contact with a plurality of regions on a head of a patient, the stimulation settings having adjustable parameters comprising frequency, pulse width, and amplitude, and the plurality of regions comprising a front left region, a front right region, a rear left region, and a rear right region;

obtaining, by the computing device, feedback information from the patient, the feedback information comprising the patient indicating the patient experiences paresthesia each region in the plurality of regions; and automatically adjusting, by the computing device, at least one of the adjustable parameters based on the feedback information from the patient, wherein the configuring further comprises:
stimulating, by the computing device, each region in the plurality of regions using a first electrode in the at least one electrode array,
increasing, by the computing device, the amplitude setting for the first electrode, and
repeating the stimulating using additional electrodes in the at least one electrode array until the stimulation settings for each electrode in the at least one electrode array have been configured.

2. The method of claim 1, further comprising automatically adjusting the at least one of the adjustable parameters based on the feedback information until the patient experiences paresthesia.

3. The method of claim 2, further comprising determining the patient experiences paresthesia based on image information obtained by at least one imaging device of the computing device, wherein the image information is processed to determine a heart rate of the patient.

4. The method of claim 3, wherein the at least one imaging device registers at least one of: a time when the patient experiences the paresthesia, and a location on the patient where the patient experiences the paresthesia.

5. The method of claim 2, wherein the automatically adjusting the at least one of the adjustable parameters occurs until the patient experiences one or more side effects, wherein the one or more side effects comprises discomfort or muscle recruitment.

6. The method of claim 1, wherein the at least one electrode array provides supraorbital nerve stimulation (SONS).

7. The method of claim 1, wherein the at least one electrode array comprises eight electrodes.

8. The method of claim 1, further comprising receiving feedback from the patient, the feedback comprising input provided to a touch screen interface provided by a display of the computing device, the feedback comprising a selection of one of paresthesia and a side-effect.

9. The method of claim 8, further comprising setting the at least one of the adjustable parameters based on the feedback from the patient.

10. The method of claim 1, further comprising configuring the stimulation settings for at least two electrodes in the at least one electrode array.

11. The method of claim 1, further comprising registering the at least one electrode array by registering at least one finger of the patient with a capacitive sensor device of the at least one electrode array.

12. The method of claim 1, further comprising randomly repeatedly configuring the stimulation settings by increasing a stimulation amplitude by a particular amount until reaching a maximum amount for at least two electrodes in the electrode array.

13. The method of claim 1, further comprising configuring the stimulation settings for at least two electrodes in the electrode array, a first set of electrodes in the at least two electrodes associated with a first zone that stimulates a first region on a face of the patient and a second set of electrodes in the at least two electrodes associated with a second zone that stimulates a second region different from the first region on the face of the patient.

14. The method of claim 13, wherein the first region is associated with a left side of the face and the second region is associated with a right side of the face.

15. The method of claim 13, wherein one of the first region and the second region is associated with paresthesia that runs up to a top of a head of the patient.

16. The method of claim 1, further comprising determining particular stimulation settings that provide a minimum number of side effects and provide a maximum paresthesia for the patient and automatically adjusting the at least one of the adjustable parameters using the particular stimulation settings.

17. The method of claim 1, further comprising:
randomly repeating the configuring of the stimulation settings by increasing amplitude by a pre-determined amount until the amplitude reaches a maximum amount for at least two electrodes in the at least one electrode array.

18. The method of claim 1, wherein the at least one electrode array registers at least one finger of the patient via capacitive sensing.

19. The method of claim 18, wherein the capacitive sensing comprises measuring a change in impedance due to tissue change when the at least one finger is in proximity to the at least one electrode array.

20. The method of claim 1, wherein the at least one electrode array comprises a capacitive sensor device, wherein the capacitive sensor device registers at least one finger of the patient.

21. The method of claim 1, wherein the increasing is performed until, in response to the stimulating, the patient exhibits at least one of: an uncomfortable sensation, or muscle recruitment.

22. The method of claim 1, wherein the paresthesia comprises a tingling sensation.

23. The method of claim 1, wherein the plurality of regions are on an exterior surface of the head of the patient.

24. The method of claim 1, wherein the feedback information further comprises the patient indicating the patient experiences paresthesia from a forehead to a top of the head.

25. A therapy configuration system comprising:
a processor; and
a memory device in communication with the processor, the processor to:
configure stimulation settings for each electrode in at least one electrode array in physical contact with a full width of a plurality of regions on a head of a patient, the stimulation settings having adjustable parameters comprising frequency, pulse width and amplitude, and the plurality of regions comprising a front left region, a front right region, a rear left region, and a rear right region;
obtain physiological feedback information from the patient; and
automatically adjust, based on the physiological feedback from the patient, at least one of the adjustable parameters until the patient experiences paresthesia across the full width of each of the plurality of regions.

26. A non-transitory computer-readable storage medium, having instructions stored thereon that, when executed by at least one computing device cause the at least one computing device to perform operations, the operations comprising:

configuring stimulation settings for each electrode in an at least one electrode array in physical contact with a patient, the stimulation settings having adjustable parameters comprising frequency, pulse width, and amplitude;

obtaining feedback information from the patient that indicates the patient is experiencing one or more sensations on each of a plurality of regions on a head of the patient, the plurality of regions comprising a front left region, a front right region, a rear left region, and a rear right region; and automatically adjusting, for each of the plurality of regions, at least one of the adjustable parameters until the patient indicates that the patient is experiencing at least one of: a first sensation in the one or more sensations, and a second sensation in the one or more sensations, wherein the first sensation comprises tingling associated with paresthesia, and wherein the second sensation comprises pain not associated with paresthesia.

27. The non-transitory computer-readable storage medium of claim 26, wherein the operations further comprise:

obtaining feedback information from the patient that indicates the patient is experiencing the one or more sensations from a forehead to a top of the head; and automatically adjusting at least one of the adjustable parameters until the patient indicates that the patient is experiencing at least one of: the first sensation, and the second sensation, from the forehead to the top of the head.

28. The therapy configuration system of claim 25, wherein the obtaining physiological feedback information is performed by at least one imaging device.

29. The therapy configuration system of claim 25, wherein the physiological feedback information comprises one or more facial expressions of the patient.

30. The therapy configuration system of claim 25, wherein the processor is further configured to:

determine particular stimulation settings that provide a maximum paresthesia across the full width of the plurality of regions.

31. The therapy configuration system of claim 25, wherein the processor further to:

automatically adjust, based on the physiological feedback from the patient, at least one of the adjustable parameters until the patient experiences paresthesia from a forehead to a top of the head.

32. The non-transitory computer-readable storage medium of claim 26, wherein the operations further comprise:

determining, after the obtaining of the feedback information, one or more electrodes in the at least one electrode array associated with the location.

* * * * *